US009303991B2

(12) United States Patent
Garrone

(10) Patent No.: US 9,303,991 B2
(45) Date of Patent: Apr. 5, 2016

(54) ELECTRONIC DEVICE WITH CALIBRATED COMPASS

(71) Applicant: Apple Inc., Cupertino, CA (US)

(72) Inventor: Ryan J. Garrone, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 14/322,734

(22) Filed: Jul. 2, 2014

(65) Prior Publication Data

US 2015/0089823 A1 Apr. 2, 2015

Related U.S. Application Data

(60) Provisional application No. 61/883,599, filed on Sep. 27, 2013.

(51) Int. Cl.
*G01C 17/38* (2006.01)

(52) U.S. Cl.
CPC ...................... *G01C 17/38* (2013.01)

(58) Field of Classification Search
CPC ........................................ G01C 17/38
USPC .......................................... 33/356
See application file for complete search history.

(56) References Cited

U.S. PATENT DOCUMENTS

| | | | | |
|---|---|---|---|---|
| 4,571,843 A * | 2/1986 | Lindskog | ............... | G01C 17/14 33/349 |
| 5,511,319 A * | 4/1996 | Geerlings | ............... | G01C 17/38 33/355 R |
| 7,154,267 B2 | 12/2006 | Withanawasam | | |
| 7,865,323 B2 | 1/2011 | Hirobe et al. | | |
| 8,339,123 B2 | 12/2012 | Chen et al. | | |
| 8,494,799 B2 | 7/2013 | Piemonte et al. | | |
| 9,046,365 B2 * | 6/2015 | Wade | ...................... | G01C 17/28 |
| 2007/0089311 A1 * | 4/2007 | Amundson | ............ | G01C 17/28 33/355 R |
| 2013/0085698 A1 | 4/2013 | Wade et al. | | |
| 2013/0104410 A1 | 5/2013 | Wade et al. | | |
| 2013/0237255 A1 * | 9/2013 | Shinada | ................ | H04W 4/026 455/456.6 |
| 2014/0107860 A1 | 4/2014 | Bugno et al. | | |
| 2014/0297213 A1 * | 10/2014 | Lee | ......... | G01C 17/38 702/93 |
| 2015/0006099 A1 * | 1/2015 | Pham | ...................... | G01C 17/38 702/93 |
| 2015/0012234 A1 * | 1/2015 | Annen | .................... | G01C 17/28 702/93 |
| 2015/0276403 A1 * | 10/2015 | Schierbeek | ............ | G01C 17/38 33/354 |
| 2015/0285689 A1 * | 10/2015 | Brock | ................ | B60H 1/00978 374/163 |

\* cited by examiner

*Primary Examiner* — G. Bradley Bennett
(74) *Attorney, Agent, or Firm* — Treyz Law Group, P.C.; G. Victor Treyz

(57) ABSTRACT

An electronic device may have electrical components mounted in alignment with an electronic device housing. A compass in the electronic device housing may potentially be misaligned with respect to the electrical components and the electronic device housing. Reference devices having compasses may be used to gather compass data while one or more electrical components in the reference devices are controlled to generate magnetic fields that are detected by the compasses. An electronic device may be calibrated in a factory or in the field using calibration data produced by comparing compass readings gathered from the compass in the device while controlling electrical components in the device to compass data from the reference devices. Calibration data may be applied to compass readings in real time to correct for misalignment between the compass and the electronic device housing.

19 Claims, 6 Drawing Sheets

ELECTRONIC DEVICE WITH CALIBRATED COMPASS

This application claims the benefit of provisional patent application No. 61/883,599, filed Sep. 27, 2013, which is hereby incorporated by reference herein in its entirety.

BACKGROUND

This relates generally to electronic devices and, more particularly, to electronic devices with compasses.

Electronic devices are sometimes provided with compasses. For example, a handheld Global Positioning System (GPS) device or cellular telephone may have a compass. Compass readings from the compass may be used for functions such as ensuring that maps are oriented correctly when displayed for a user.

Satisfactory compass performance is dependent on accurate alignment of the compass. If care is not taken, a compass may be misaligned with respect to the device in which it is housed and the resulting readings produced by the compass will be inaccurate. During manufacturing, devices that contain compasses are sometimes subjected to coarse "pass-fail" testing by passing the devices through a fixed magnetic field. If the compass in a device does not respond to the applied magnetic field, the device will not pass testing. Such coarse pass-fail testing is not, however, able to address whether or not the compass is properly aligned within a device.

It would therefore be desirable to provide improved ways to ensure that electronic devices with compasses will perform satisfactorily.

SUMMARY

An electronic device may have electrical components mounted in alignment with an electronic device housing. The electrical components may include components such as a camera with an adjustable focus, a camera flash, and a radio-frequency transceiver. Components such as these may draw sufficient current during operation to generate magnetic fields in the vicinity of a compass within the electronic device.

The electrical components may be mounted on a substrate such as a rigid printed circuit board. The rigid printed circuit board may be well aligned with respect to the electronic device housing. The compass in the electronic device housing may be mounted on a flexible printed circuit that is coupled to the printed circuit board. Due to normal manufacturing variations or due to a drop event, there is a potential for misalignment between the compass and the electronic device housing. During operation of the electronic device, control circuitry in the electronic device can apply calibration data to compass readings from the compass. The control circuitry may, for example, apply a calibration rotation matrix to raw compass data. The calibration data may correct compass readings from the compass for misalignment between the compass and the electronic device housing.

Reference devices may be used in gathering compass data. The reference devices may have compasses that are aligned with respect to their housings or that are in a known orientation with respect to their housings. Compass data may be acquired within the reference devices while electrical components in those devices that are aligned with respect to the housings of the reference devices are controlled to generate magnetic fields. Device-specific compass calibration data may be produced by comparing compass readings from a device to be calibrated to compass readings associated with the reference devices. Both the compass readings from the reference devices and the compass readings from the device to be calibrated are preferably obtained while using the same set of operating conditions for the electronic components that produce the magnetic fields. An electronic device may be calibrated in a factory or in the field using the calibration data.

DETAILED DESCRIPTION

An electronic device may be provided with a compass. The compass may be used to gather compass readings (orientation data). The compass readings are indicative of how the compass is oriented. Electrical components within the device may be used to generate magnetic fields that are used in calibrating the compass. Calibration operations may be performed as part of a manufacturing process and during normal operation of an electronic device in the field by a user.

Figure 1:
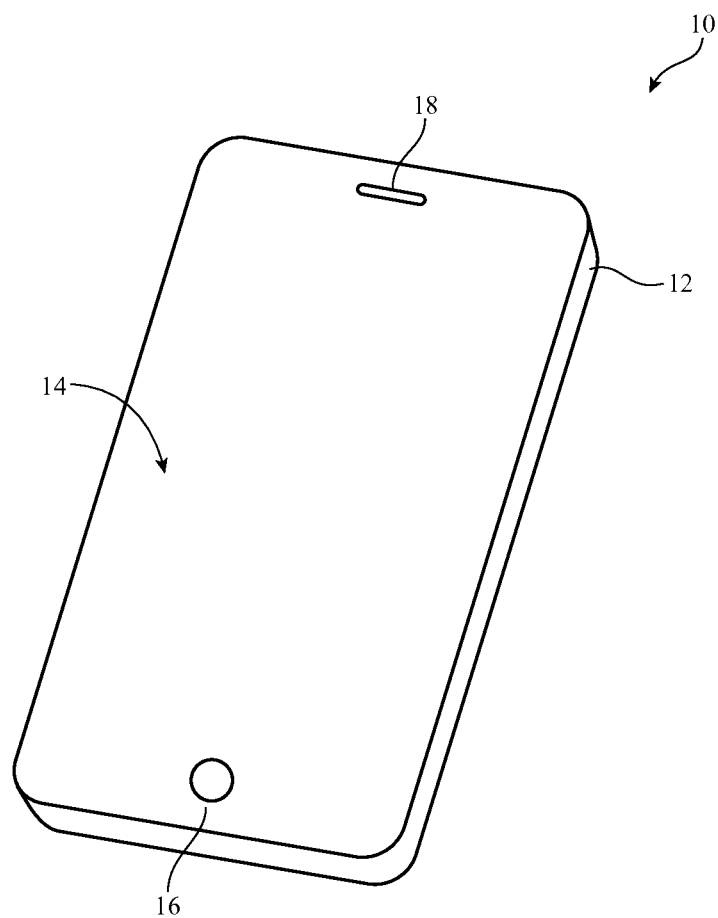
FIG. 1 is a perspective view of an illustrative electronic device such as a handheld computing device of the type that may be provided with a compass in accordance with an embodiment.

An illustrative electronic device of the type that may be provided with compass is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

Device 10 may have one or more displays such as display 14 mounted in housing structures such as housing 12. Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable display pixel structures such as organic light-emitting diode display pixels, electrophoretic display pixels, plasma display pixels, etc. A display cover layer may cover the surface of display 14 or a display layer such as a color filter layer (e.g., a layer formed from a clear substrate covered with patterned color filter elements) or other portion of a display may be used as the outermost (or nearly outermost) layer in display 14. If desired, openings may be formed in the outermost layer of display 14 to accommodate components such as button 16 and speaker port 18.

Figure 2:
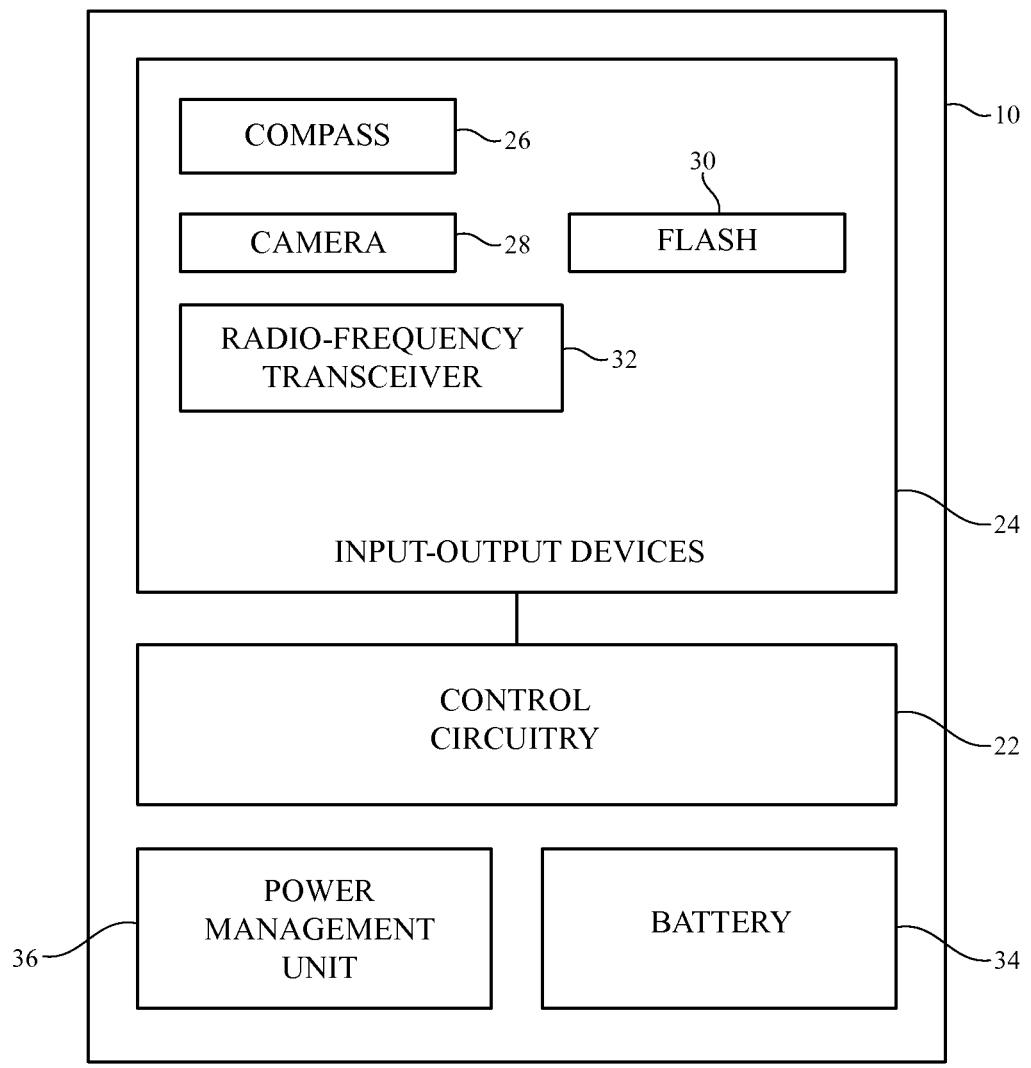
FIG. 2 is a schematic diagram of an illustrative electronic device with a compass in accordance with an embodiment.

A schematic diagram of an illustrative configuration that may be used for electronic device 10 is shown in FIG. 2. As shown in FIG. 2, electronic device 10 may include control circuitry 22. Control circuitry 22 may include storage and processing circuitry for controlling the operation of device 10. Control circuitry 22 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 22 may include processing circuitry based on one or more microprocessors, microcontrollers, digital signal processors, baseband processors, power management units, audio codec chips, application specific integrated circuits, etc.

Input-output devices 24 may be used to allow data to be supplied to device 10 and to allow data to be provided from device 10 to external devices. Input-output devices 24 may also include input-output components with which a user can control the operation of device 10. A user may, for example, supply commands through input-output devices 24 and may receive status information and other output from device 10 using the output resources of input-output devices 24.

Input-output devices 24 may include sensors and status indicators such as an ambient light sensor, a proximity sensor, a temperature sensor, a pressure sensor, an accelerometer, and light-emitting diodes and other components for gathering information about the environment in which device 10 is operating and providing information to a user of device 10 about the status of device 10. Compass 26 may be used to determine the orientation of device 10 in space relative to the Earth's magnetic pole. Compass readings may be used to orient maps on display 14, may be used to assist in navigation operations, and may be used by other applications running on device 10. Audio components in devices 24 may include speakers and tone generators for presenting sound to a user of device 10 and microphones for gathering user audio input. Devices 24 may include one or more displays such as display 14 of FIG. 1. Displays may be used to present images for a user such as text, video, and still images. Sensors in devices 24 may include a touch sensor array that is formed as one of the layers in display 14. During operation, user input may be gathered using buttons and other input-output components in devices 24 such as touch pad sensors, buttons, joysticks, click wheels, scrolling wheels, touch sensors such as a touch sensor array in a touch screen display or a touch pad, key pads, keyboards, vibrators, and other input-output components.

Input-output devices 24 may use one or more cameras such as camera 28 to acquire digital images. Camera flash 30 may provide subject illumination for images being acquired by camera 28. Camera flash 30 may be based on one or more light-emitting diodes or other light sources.

Input-output devices 24 may include wireless communications circuitry such as radio-frequency transceiver 32 and one or more antennas. Transceiver circuitry 32 may be formed from one or more integrated circuits and may be coupled to the antennas of device 10 through power amplifier circuitry, low-noise input amplifiers, passive RF components, or other circuitry. A baseband processor integrated circuit (e.g., an integrated circuit in control circuitry 22) may be used to provide transceiver 32 with signals that are to be wirelessly transmitted by device 10 and may be used to process signals that transceiver 32 has received using antenna structures in device 10.

Power may be supplied to input-output devices 24 and control circuitry 22 using battery 34 and other sources of power. Power management unit 36 (e.g., one or more integrated circuits) may be used in regulating power delivery from battery 34 and other sources of power. The electrical components of device 10 (e.g., compass 26, camera 28, flash 30, radio-frequency transceiver circuitry 32, and other input-output devices 24, integrated circuits in control circuitry 22, power management unit 36, and battery 34 may be interconnected within device 10 using signal lines on printed circuits, wires, coaxial cables and other transmission lines, and other signal paths. For example, electrical components may be interconnected using signal lines formed from metal traces on printed circuits such as rigid printed circuit boards (e.g., printed circuits formed from fiberglass-filled epoxy or other rigid printed circuit board material) or flexible printed circuits (e.g., flex circuits formed from sheets of polyimide or layers of other flexible polymer). Printed circuits may be joined using solder joints, connectors, conductive adhesive connections, or other conductive connections.

Figure 3:
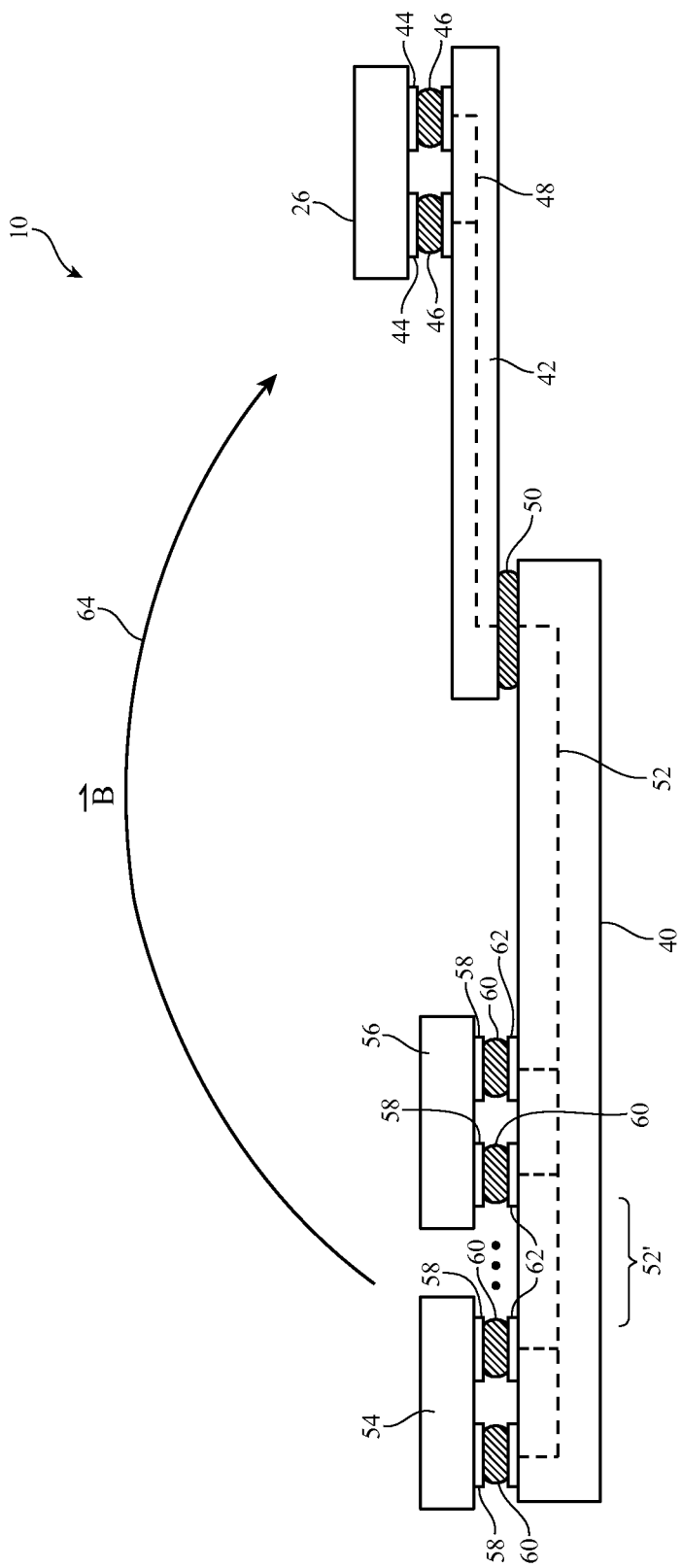
FIG. 3 is a cross-sectional side view of printed circuits that may be populated with electronic components such as integrated circuits and a compass in an electronic device in accordance with an embodiment.

FIG. 3 is a cross-sectional side view of illustrative printed circuits and electrical components of the type that may be used in electronic device 10. As shown in FIG. 3, device 10 may include compass 26. Compass 26 may be formed from a Hall effect sensor, a microelectromechanical systems (MEMS) compass, or other magnetic sensor for gathering information on the presence of magnetic fields (i.e., the Earth's magnetic field). Compass 26 may be mounted on printed circuit 42. Compass 26 may, for example, have contacts 44 that are soldered to solder pads 46 and other traces 48 in printed circuit 42 using solder 46. Traces 48 may be metal signal lines formed from metals such as copper, aluminum, molybdenum, other metals, and combinations of these metals.

Conductive connections 50 may be used in coupling printed circuit 42 to one or more other printed circuits such as printed circuit board 40. For example, connections 50 may be used to electrically couple traces 48 in printed circuit 42 to traces 52 in printed circuit 40. Connections 50 may be formed from solder, conductive adhesive, connectors, etc.

Traces 52 may be used to interconnect electrical components such as components 54 and 56. Components 54 and 56 may have contacts 58 that are soldered to solder pads 62 in traces 52 on printed circuit 40 using solder 60. Traces 52 may include metal signals lines formed from metals such as copper, aluminum, molybdenum, other metals, and combinations of these metals.

Printed circuits such as printed circuits 40 and 42 may be rigid printed circuit boards, rigid flex (e.g., rigid printed circuit boards with integral flex circuit tails), or flexible printed circuits. As an example, printed circuit 42 may be a flexible printed circuit and printed circuit 40 may be a rigid printed circuit board. Two printed circuits are shown in FIG. 3, but, in general, any suitable number of printed circuits may be coupled together if desired within device 10 (e.g., two printed circuits, three or more printed circuits, four or more printed circuits, etc.). Each printed circuit may be coupled to one or more electrical components such as integrated circuits, a camera (e.g., a digital image sensor such as camera 28), a camera flash such as camera flash 30, a radio-frequency transceiver circuit such as transceiver 32 of FIG. 2 (e.g., a wireless local area network transceiver such as an 802.11 transceiver operating at 2.4 GHz and/or 5 GHz, a cellular telephone transceiver circuit, a Bluetooth® transceiver, or other wireless transceiver circuitry), or other electrical components.

Components 54 and 56 and compass 26 may send and receive signals (e.g., power and/or data signals) over signal paths in printed circuits 40 and 42. For example, control circuitry 22 (e.g., control circuitry implemented using one or more integrated circuits or other electrical components mounted on printed circuit 40) may issue control signals over signal lines such as signal lines 52 and/or 48 that direct an electrical component to operate in a particular way. These signals may, for example, adjust the position of a focusing element in camera 28, may turn on flash 30, or may activate or otherwise adjust the operation of radio-frequency transceiver circuitry 32.

As electrical components 54 and 56 on board 40 are being controlled by control signals issued by control circuitry 22 (i.e., as the operating settings of one or more components are being adjusted), the electrical components will draw power. Power management unit 36 (FIG. 2) may supply power to the electrical components over signal paths 52. The amount of power that is being delivered to each electrical component varies in response to the control signals. As an example, when control circuitry 22 directs component 56 to operate in a first way that requires a first amount of power delivery to component 56, component 54 (e.g., a power management unit) may supply a first amount of power over path 52, whereas when control circuitry 22 directs component 56 to operate in a second way that requires a second amount of power delivery to component 56, component 54 (e.g., a power management unit) may supply a second amount of power over path 52.

As power is being delivered from component 54 to component 56, a current that is proportional to the amount of power that is being delivered will flow in the power supply line (e.g., in signal line segment 52' in the example of FIG. 3). This current will, in turn, generate magnetic fields such as magnetic field 64. Compass 26 is sensitive to the presence of magnetic fields, and will therefore be affected by the presence of magnetic field 64.

During normal operation of device 10 in the field by a user, compass 26 can acquire compass readings during periods of time when potentially interfering electronic components are not being actively used and/or can be calibrated to compensate for the presence of magnetic fields such as magnetic field 64. For example, if it is determined that operation of an electromagnetic actuator such as a lens focusing coil in camera 28 produces a particular interfering magnetic field 64 (through operation of the coil and/or as a result of current flow through paths such as path segment 52') during operation of camera 28, use of camera 28 can be avoided when making compass readings with compass 26 and/or the impact of the magnetic field that arises from operating camera 28 can be quantified in advance so that compass readings can later be adjusted by subtracting out the magnetic field contribution from camera 28.

Calibration operations may also be performed to compensate for potential misalignment of compass 26 relative to housing 12. Misalignment between compass 26 and electronic device housing 12 in device 10 may be due to factors such as misalignment of compass 26 relative to the printed circuit to which compass 26 is mounted or misalignment of the printed circuit to which compass 26 is mounted relative to housing 12.

Figure 4:
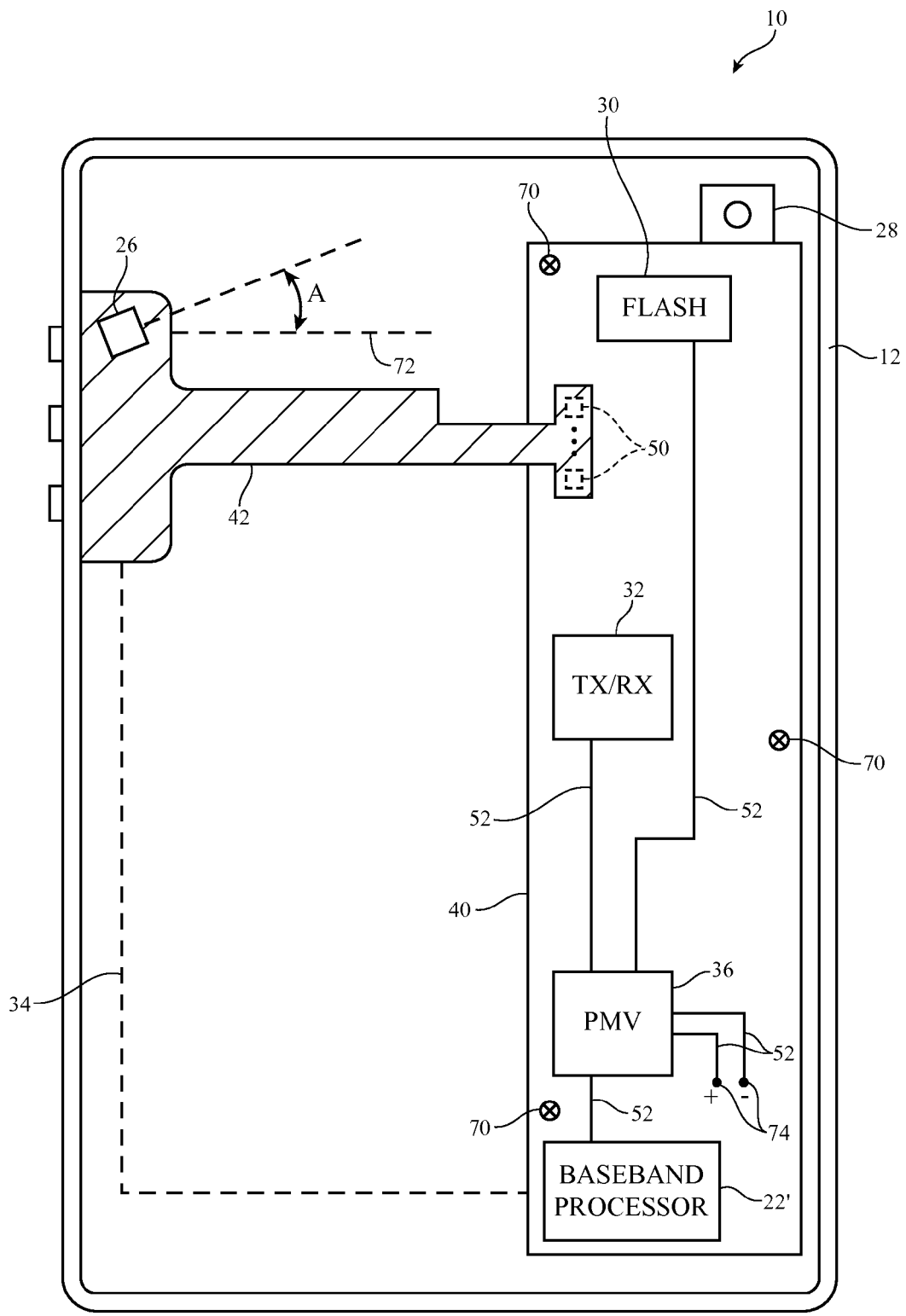
FIG. 4 is a top interior view of an illustrative electronic device having electrical components on a rigid printed circuit board mounted to an electronic device housing and having a printed circuit with a compass that is coupled to the rigid printed circuit board in accordance with an embodiment.

Consider, as an example, the illustrative configuration of device 10 that is shown in FIG. 4. FIG. 4 is an interior view of an electronic device such as device 10 of FIG. 1 in which display 14 has been removed from the front face of the device to reveal interior components. As shown in FIG. 4, device to may have housing 12. Housing 12 may be formed from materials such as metal, plastic, carbon-fiber composite and other fiber-composite material, glass, ceramic, or other materials. Printed circuits such as printed circuit 40 and printed circuit 42 may be mounted in device housing 12. Electrical components such as camera 28, flash 30, radio-frequency transceiver 32, power management unit 36, control circuitry 22 such as baseband processor 22' and other storage and processing circuitry, compass 26, and other electrical components may be mounted on the printed circuits. Battery 34 may be coupled to power management unit 36 by paths 52 and terminals 74. Paths 52 may also be used in interconnecting other electrical components on printed circuit board 40.

Compass 26 may be formed from a Hall effect sensor, a MEMS device, or other electrical component for measuring the Earth's magnetic field. Compass 26 may be sensitive to stresses within the printed circuit to which it is mounted. It may be desirable to mount printed circuits in device 10 to device housing 12 using fasteners such as screws. For example, printed circuit 40 may be a rigid printed circuit board that is attached to housing 12 using screws 70. The presence of screws 70 and the presence of heat fluctuations generated by the components mounted to printed circuit board 40 may give rise to stresses on the electrical components mounted on printed circuit board 40.

The presence of printed circuit board stress may make it difficult for a compass such as a compass based on Hall effect sensors that is mounted on the printed circuit board to make accurate compass readings. It may therefore be desirable to locate compass 26 on a printed circuit that is separate from printed circuit 40 such as printed circuit 42 of FIG. 4. Printed circuit 42 may be, for example, a flexible printed circuit.

As shown in FIG. 4, flexible printed circuit 42 may be coupled to rigid printed circuit board 40 using connections 50. Connections 50 may be conductive adhesive connections, connections formed from solder joints, or other connections.

Due to manufacturing variations, the placement of structures in devices 10 during manufacturing can vary from device to device. Some structures can be placed with high accuracy. For example, rigid printed circuit boards that are attached directly to housing 12 such as printed circuit board 40 will generally be accurately aligned with respect to housing 12 during assembly operations (e.g., when attaching printed circuit board 40 to housing 12 with screws 70). Other manufacturing operations are more prone to placement errors. For example, the process of attaching flexible printed circuit 42 to printed circuit 40 using connections 50 and the process of soldering or otherwise attaching compass 26 on flexible printed circuit 42 may be subject to lateral placement variations and angular placement variations. These variations may give rise to uncertainty in the orientation of compass 26 relative to housing 12. For example, there may be uncertainty in angular orientation A of compass 26 in the plane of device 10 relative to housing 12 that arises from uncertainty in the angular orientation of compass 26 relative to flexible printed circuit 42 and angular uncertainty of the angular orientation of flexible printed circuit 42 to printed circuit board 40 following formation of electrical connections 50.

Uncertainty in the position of compass 26 relative to device 10 and housing 12 can degrade compass performance. For example, a user of device 10 may desire to use a navigation application or other application in which device housing 12 displays an on-screen map that is oriented in a particular direction based on compass readings or may desire to use an application that presents an on-screen representation of a compass to a user. Accurate orientation of the on-screen map or on-screen compass depends on the accuracy of the compass readings relative to the position of the housing. If, for example, compass 26 is misaligned with respect to flexible printed circuit 42 and/or flexible printed circuit 42 is misaligned with respect to housing 12 and other structures mounted to housing 12 such as board 40 and display 14, there is a potential for corresponding alignment errors in the on-screen content that depends on readings from the compass.

Printed circuit board 40 may be accurately aligned with respect so housing 12 using screws 70. However, flexible-printed-circuit-to-printed-circuit-board coupling arrangements such as connections 50 may allow flexible printed circuit 42 to be misaligned with respect to board 40 (and therefore with respect to housing 12) by up to 5° or 10° or more. In addition, misalignment of up to 5° or more is possible when using solder joints or other conductive attachment mechanisms to mount compass 26 to flexible printed circuit 42. Compass misalignment with respect to electronic device housing 12 may also arise when device 10 is inadvertently exposed to shock (e.g., during a drop event). Because of these possible sources of misalignment during manufacturing, it is possible that compass 26 will be misaligned by an angle A of up to 5 to 10° or more with respect to housing 12 (i.e., horizontal axis 72) unless corrective action is taken. This can lead to on-screen map alignment errors or other misalignment problems of 5 to 10° or more.

The effects of misalignment angle A due to manufacturing variations can be removed using calibration operations. The position of printed circuit board 40 relative to housing 12 is well known due to the use of screws 70 and/or other accurate mounting structures. As a result, the positions of signal paths 52 on board 40 and the orientations of the magnetic fields 64 relative to compass 26 that are produced by currents flowing through paths 52 and through the structures of the electrical components on printed circuit board 40 can be accurately characterized. During precalibration operations, the response of compasses with one or more known orientations relative to housing 12 can be characterized in the presence of magnetic fields 64 that are detected by the compasses. Using the characterized behavior of compass 26 to magnetic fields 64 under a variety of conditions, compass 26 in a given device can be calibrated (i.e., device-specific calibration data can be produced and stored in memory in control circuitry 22 of the given device).

Once calibration data has been gathered and stored in memory in control circuitry 22, raw compass readings (i.e., compass orientation vector Vraw) from compass 26 can be corrected with the calibration data in real time to produce accurate, corrected compass readings (compass orientation vector Vcor). The corrected compass readings are corrected for misalignment between compass 26 and electronic device housing 12. Real time calibration operations can be performed by retrieving the device-specific calibration data from the memory in control circuitry 22. The calibration data may take the form of a calibration matrix R, sometimes referred to as a calibration rotation matrix that can be applied to raw compass orientation data Vraw to produce corrected compass readings Vcor, as shown in equation 1.

$$Vcor=[R]Vraw \qquad (1)$$

In equation 1, Vraw is a vector containing X, Y, and Z components of a compass orientation (compass reading) received from compass 26 without correction (i.e., a vector X, Y, Z in a Cartesian coordinate system). The correction matrix R may be a three-by-three rotation matrix that rotates raw compass orientation vector Vraw to produce corrected compass reading vector Vcor. Because corrected compass reading Vcor has been calibrated, the effects of misalignment between compass 26 and housing 12 have been removed and Vcor can be used by applications (including operating system functions and other software) on device 10 such as a navigation map, a compass application, or other function in which the accurate orientation between compass 26 and device 10 ensures accurate operation of the application.

The amount of magnetic field 64 in each of dimensions X, Y, and Z that is produced when operating each electrical component and the resulting impact on compass readings from compass 26 in dimensions X, Y, and Z can be characterized empirically using a reference device (sometimes called a golden device or golden device under test) in which compass 26 has been accurately mechanically aligned with housing 12 and horizontal axis 72 or by using one or more reference devices in which the orientation of compass 26 relative to housing 12 has been measured and is therefore known. After aligning board 40 (and therefore the components and paths 52 on board 40) with respect to housing 12 in the reference device to ensure that compass 26 is aligned with housing 12 (or after measuring the amount of misalignment between compass 26 and housing 12), control circuitry 22 (FIG. 2) may operate one or more of the electrical components on printed circuit board 40 at one or more operating levels. As an example, control circuitry 22 may direct camera 28 to move its lens to an "infinity focus" position, an "intermediate focus" position, or a "minimum focus distance" position, control circuitry 22 may direct radio-frequency transceiver 32 to perform a particular wireless function (e.g., to transmit or receive signals), flash 30 may be operated at one or more illuminations levels, two or more electrical components may be operated at respective levels, etc.

Figure 5:
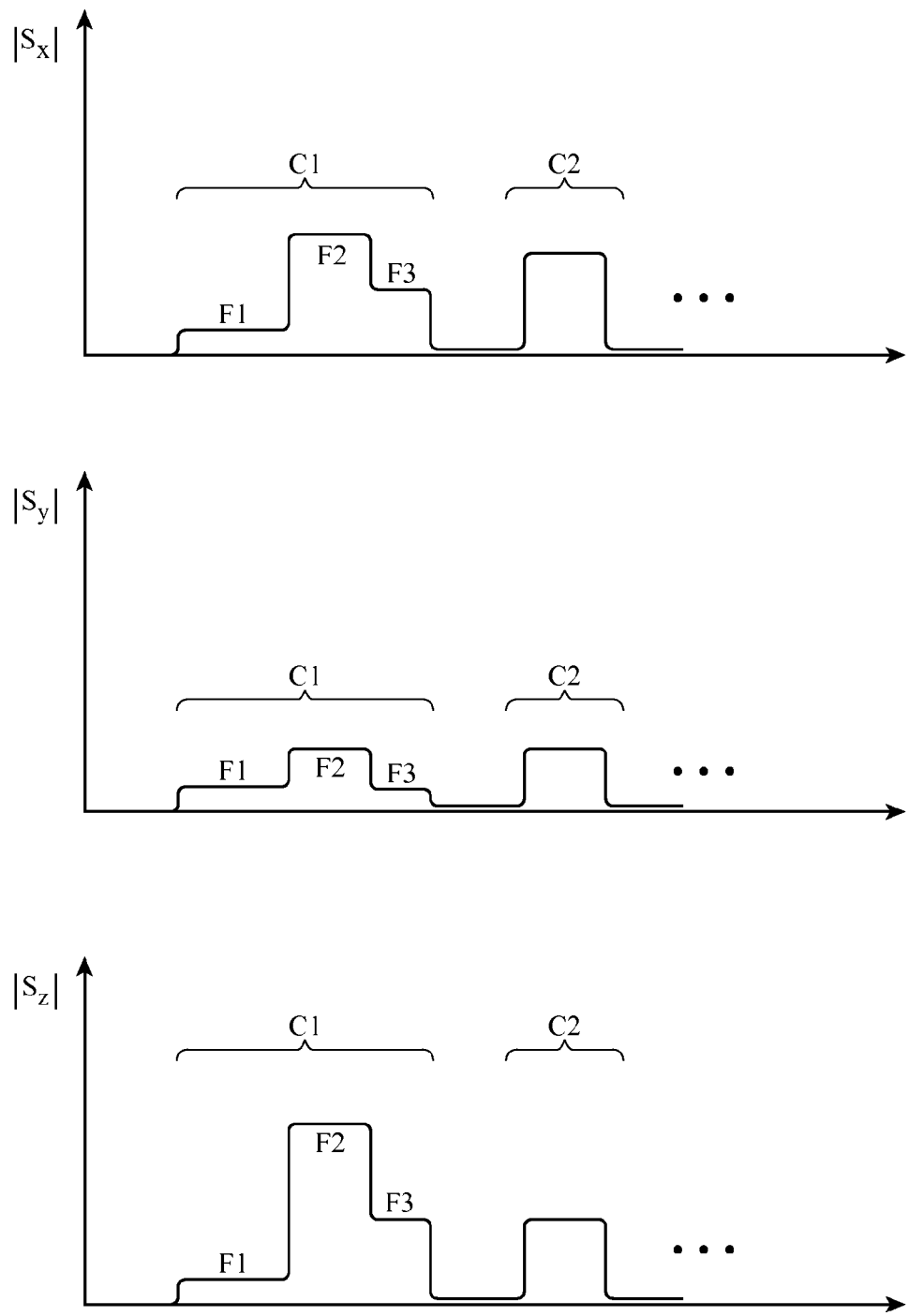
FIG. 5 is a graph showing illustrative compass measurements that may be made while simultaneously adjusting the operation of electrical components in an electronic device in accordance with an embodiment.

FIG. 5 is a graph of illustrative compass measurements of the type that may be made during calibration operations on a given device that contains a compass to be calibrated. In the example of FIG. 5, compass readings are being collected in three different dimensions (e.g., compass signal Sx in dimension X as shown in the upper trace of FIG. 5, compass signal Sy in dimension Y as shown in the middle trace of FIG. 5, and compass signal Sz in dimension Z as shown in the lower trace of FIG. 5). During illustrative calibration operations C1 of FIG. 5, control circuitry 22 directs camera 28 to operate under three different focus settings: F1 (e.g., infinity focus), F2 (e.g., minimum focus distance), and F3 (a focus at an intermediate distance). During illustrative calibration operations C2, control circuitry 22 directs a component such as radio-frequency transceiver 32 or flash 30 to operate at a single setting. During other calibration operations, control circuitry 22 directs one or more other components to operate at various settings. During these calibration operations, control circuitry 22 uses compass 26 to gather compass readings. Comparison of this compass reading data from the compass in the given device to baseline data gathered from one or more reference devices allows device-specific calibration data to be generated. This device-specific calibration data can be generated as part of a manufacturing test and/or during use of device 10 in the field by a user.

The compass readings obtained by compass 26 are affected by the magnetic fields produced by the currents flowing in paths 52 and currents flowing within the electrical components in device 10 during calibration operations. For example, if a strong current is flowing in a path 52 that is near to compass 26, the resulting strong magnetic field that is produced will affect compass 26 strongly. If a weak current is flowing in path 52 and/or if path 52 is located far from compass 26 or is oriented relative to compass 26 in a way that produces a weak magnetic field at compass 26, compass 26 will be only weakly affected.

By comparing compass readings obtained during calibration in a given electronic device 10 that is being operated in a factory test or in the field by a user to baseline compass readings obtained by a compass in a reference device during reference device calibration operations (sometimes referred to as precalibration), the calibrating corrections that are to be used by the given electronic device (e.g., corrective rotation matrix R) may be calculated and stored in the given device. During subsequent operation of the given device, the device (e.g., control circuitry 22) may use the calibration data (e.g., rotation matrix R) to calibrate compass readings from the compass to correct for misalignment of the compass with respect to housing 12.

Figure 6:
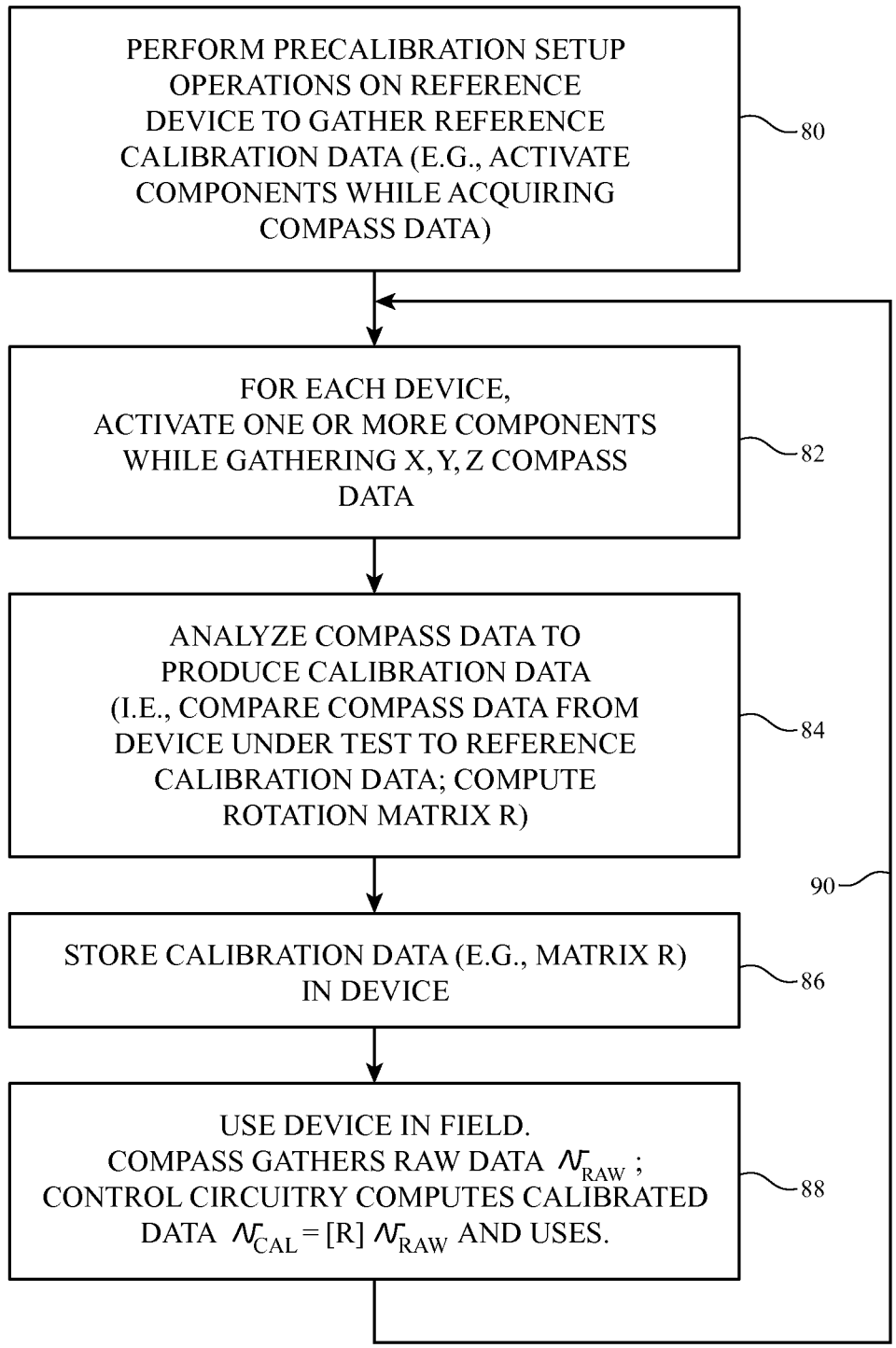
FIG. 6 is a flow chart of illustrative operations involved in calibrating and operating an electronic device with a compass in accordance with an embodiment.

FIG. 6 is a flow chart of illustrative steps involved in calibrating and operating electronic devices such as device 10 using internally-generated magnetic fields from operating electrical components such as the electrical components on printed circuit board 40 of device 10 of FIG. 4.

At step 80, setup operations (precalibration operations) may be performed. During the operations of step 80, the compass in each of one or more reference devices may be characterized over a variety of electronic component operating conditions. As an example, compass readings in X, Y, and Z dimensions may be gathered by control circuitry within a reference device while electrical components are operated at various different levels. The reference device is a device in which the orientation of compass 26 is perfect (or nearly perfect) with respect to housing 12 or is a device in which the orientation of compass 26 relative to housing 12 has been measured. Precalibration operations may be performed using an aligned compass in a reference device or, if desired, a representative set of reference devices may be tested (e.g., a set of devices each having a compass with a different known orientation relative to the electrical components and paths on printed circuit board 40). By measuring compass readings from all of the different reference devices in the set and correlating the compass orientations in the different devices with the resulting compass readings in a database, the behavior of the compass in response to alignment variations and a variety of electrical component operating conditions can be characterized. These characteristics can serve as baseline compass data (i.e., compass readings as a function of known compass-to-housing orientation data and known electrical component operating conditions) for use in subsequent calibration operations.

The electrical components that are operated during the calibration operations of step 80 may include components such as a camera flash, a camera, a radio-frequency transceiver, and other electronic components on a printed circuit board such as board 40 of FIG. 4 that is screwed to housing 12 with screws 70 or that is otherwise well aligned with respect to housing 12. Because compass 26 in each reference device(s) is also well aligned with respect to housing 12 or is at least oriented at a known angle with respect to housing 12, the compass readings that are taken during the reference device calibration operations of step 80 can be used to precisely characterize how compasses are affected (i.e., how much magnetic field is produced for each axis of a compass) under each of the variety of different operating conditions and, if desired, a variety of different compass orientations. By knowing how reference devices responds to different electrical component operations (i.e., different current flows through the various paths 52 on board 40), the compass operations of a given non-reference device can be calibrated to correct for misalignment between the compass and the housing in the given device. The compass readings that are obtained using references device may be stored in the reference devices and/or may be stored and analyzed by external computing equipment (e.g., one or more computers in a network, etc.).

At step 82, the compass in a given electronic device 10 that is to be calibrated can be used to gather compass readings while one or more electrical components within the given electrical device are being operated. Control circuitry 22 may, for example, direct a camera to operate at one or more different focus settings (operating levels) while compass readings are acquired, may direct a camera flash or transceiver to operate at one or more settings while compass readings are acquired, or may operate other components in a way that is known (from the baseline data acquired during the precalibration operation of step 80) to produce magnetic fields that affect compass readings from 26 compass in a known way.

After gathering compass data for the given device at step 82, the acquired compass readings can be analyzed at step 84. Calibration may be performed in a factory setting (e.g., during manufacturing while device 10 is interfacing with external computing equipment) or may be performed in the field when device 10 is being operated by a user. The analysis of step 82 may be performed by external computing equipment when calibration is being performed on the given device during manufacturing or may be performed by control circuitry 22 within device 10 (e.g., during manufacturing calibration operations or during calibration operations in the field). During compass data analysis, the compass readings that were acquired during step 82 when operating electrical components on board 40 using a given set of settings can be compared to the compass readings that were obtained when operating the same electrical components in the reference device(s) using the same set of settings. If, for example, the reference device compass measurements of step 80 were gathered when operating a camera at three different focus points, the compass readings of step 82 will be acquired when operating the camera in the given device at the same three focus points, so that the difference in compass readings at the three different focus points can be computed.

If there is no difference between the compass readings in a reference device with a perfectly aligned compass and the compass readings of step 82, the compass in the given device is perfectly aligned with respect to housing 12. If, however, the compass readings obtained during step 82 on the given device differ from the compass readings obtained during step 80 on s reference device with an aligned compass, a set of calibration data can be obtained by comparing the compass readings from step 82 to the compass readings obtained during the operations of step 80. The compass data from step 80 may corresponding to readings from a set of electronic devices each of which has a compass that is aligned at a different known angle with respect to housing 12. The comparisons of step 84 may be used to compute a calibrating rotation matrix R. Calibration data such as calibration matrix R is specific to the given device and therefore serves as device-specific calibration data.

At step 86, calibration matrix R or other device-specific calibration data for the given device that gathered the compass data at step 82 can be stored in the given device. For example, matrix R may be stored in storage within control circuitry 22.

At step 88, the given device for which compass data was gathered at step 82 can be used by a user. For example, a user may launch and use software such as a navigation application, a compass application, or other software that uses compass data from compass 26. During use of device 10 in the field by a user, control circuitry 22 may use compass 26 to gather raw compass data. Control circuitry 22 may then use device-specific compass data to calibrate the given device and thereby correct compass 26 for misalignment between compass 26 and electronic device housing 12. For example, control circuitry 22 can calibrate raw compass readings Vraw to produce calibrated compass readings Vcor by multiplying raw compass readings Vraw by rotation matrix R, as shown in equation 1. Calibrated compass data Vcor can be used by applications in device 10.

Compass 26 can be calibrated in a factory as part of a manufacturing process and/or compass 26 can be calibrated one or more times in the field during use of device 10 by a user. As indicated by line 90, for example, following calibration of compass data at step 88, processing can loop back to step 82, so that additional compass data may be acquired (step 82), so that a new calibration matrix R can be computed and stored (steps 84 and 86), and so that raw data Vraw can be acquired and corrected by applying rotation matrix R at step 88. Device 10 can loop through steps 82, 84, 86, and 88 periodically (e.g., once every day or other time period), may perform calibration in response to changes in location, accelerometer output or other data indicating that device 10 has been dropped and may therefore have caused compass 26 to become misaligned with respect to housing 12, or when other criteria have been satisfied.

The foregoing is merely illustrative and various modifications can be made by those skilled in the art without departing from the scope and spirit of the described embodiments. The foregoing embodiments may be implemented individually or in any combination.

What is claimed is:

1. A method of calibrating a compass in an electronic device that has an electronic device housing, comprising:
   gathering raw compass readings with the compass; and
   calibrating the raw compass readings using calibration data that compensates for misalignment of the compass with respect to the electronic device housing.

2. The method defined in claim 1 wherein calibrating the raw compass readings comprises multiplying the raw compass readings with a calibration rotation matrix.

3. The method defined in claim 1 further comprising:
   gathering compass data with a compass in a reference device; and
   comparing the compass data from the compass in the reference device to compass readings from the compass in the electronic device to produce the calibration data.

4. The method defined in claim 3 wherein the reference device comprises one of a set of reference devices each of which has a compass with a different orientation with respect to an electronic device housing in that reference device and wherein gathering the compass data comprises gathering the compass data from the compasses in the set of reference devices.

5. The method defined in claim 3 wherein electrical components are mounted to a printed circuit board in the electronic device housing of the electronic device and wherein gathering the compass data with the compass in the reference device comprises gathering the compass data while operating a given one of the electrical components at an operating level that creates magnetic fields at the compass in the reference device.

6. The method defined in claim 5 wherein gathering the compass data comprises gathering the compass data with the compass in the reference device while using control circuitry in the reference device to direct the given electronic component to operate at a plurality of different operating levels that create magnetic fields at the compass in the reference device.

7. The method defined in claim 6 wherein the given electrical component comprises a camera, wherein the different operating levels comprise different camera focus settings, and wherein using the control circuitry comprises using the control circuitry to adjust the focus settings while the compass data is gathered in the reference device.

8. The method defined in claim 6 wherein the given electrical component comprises an electrical component selected from the group consisting of: a radio-frequency transceiver, a camera flash, and a camera and wherein gathering the compass data with the compass in the reference device comprises gathering compass data with the compass in the reference device while using control circuitry to vary magnetic fields at the compass by operating the given electrical component.

9. An electronic device, comprising:
   a housing;
   a rigid printed circuit board mounted to the housing;
   electrical components mounted on the rigid printed circuit board;
   a flexible printed circuit coupled to the rigid printed circuit board;
   a compass mounted on the flexible printed circuit board; and
   control circuitry that corrects for misalignment of the compass with respect to the housing by calibrating compass readings from the compass.

10. The electronic device defined in claim 9 wherein the control circuitry is configured to store a calibration rotation matrix and wherein the control circuitry calibrates the compass readings by multiplying the compass readings from the compass by the calibration rotation matrix.

11. The electronic device defined in claim 10 wherein the control circuitry is configured to gather data for the calibration rotation matrix by controlling at least one of the electrical components.

12. The electronic device defined in claim 11 wherein the electrical components include a camera and wherein the control circuitry is configured to gather the data by making focus adjustments to the camera.

13. The electronic device defined in claim 11 wherein the electrical components include a camera flash and wherein the control circuitry is configured to gather the data by controlling the camera flash.

14. The electronic device defined in claim 11 wherein the electrical components include a radio-frequency transceiver and wherein the control circuitry is configured to gather the data by controlling the radio-frequency transceiver.

15. A method, comprising:
controlling operation of an electrical component mounted in an electronic device housing so that magnetic fields are produced; and
while the magnetic fields are being produced, gathering compass readings with a compass in the electronic device that detects the magnetic fields; and
producing calibration data to correct for misalignment of the compass with respect to the electronic device housing using the gathered compass readings.

16. The method defined in claim 15 wherein producing the calibration data comprises producing the calibration data based at least partly on compass data gathered in a reference electronic device that includes a compass.

17. The method defined in claim 16 wherein the compass data gathered in the reference electronic device comprises compass data gathered while producing magnetic fields in the electronic device by adjusting a camera focus and wherein producing the calibration data comprises producing the calibration data based at least partly on the compass data gathered while producing the magnetic fields.

18. The method defined in claim 16 wherein the compass data gathered in the reference electronic device comprises compass data gathered while producing magnetic fields in the electronic device by adjusting a camera flash and wherein producing the calibration data comprises producing the calibration data based at least partly on the compass data gathered while producing the magnetic fields.

19. The method defined in claim 16 wherein the compass data gathered in the reference electronic device comprises compass data gathered while producing magnetic fields in the electronic device by adjusting a radio-frequency transceiver and wherein producing the calibration data comprises producing the calibration data based at least partly on the compass data gathered while producing the magnetic fields.

* * * * *